United States Patent
Liu et al.

(10) Patent No.: US 11,468,556 B2
(45) Date of Patent: Oct. 11, 2022

(54) ARTIFICIAL INTELLIGENCE IDENTIFIED MEASURING METHOD FOR A SEMICONDUCTOR IMAGE

(71) Applicant: MSSCORPS CO., LTD., Hsinchu (TW)

(72) Inventors: Chi-Lun Liu, Hsinchu (TW); Jung-Chin Chen, Hsinchu (TW); Bang-Hao Huang, Hsinchu (TW); Chao-Wei Chen, Hsinchu (TW)

(73) Assignee: MSSCORPS CO., LTD., Hsinchu (TW)

( * ) Notice: Subject to any disclaimer, the term of this patent is extended or adjusted under 35 U.S.C. 154(b) by 130 days.

(21) Appl. No.: 17/184,594

(22) Filed: Feb. 25, 2021

(65) Prior Publication Data

US 2021/0374927 A1 Dec. 2, 2021

(30) Foreign Application Priority Data

Jun. 1, 2020 (TW) .................................. 109118308

(51) Int. Cl.
*G06K 9/62* (2022.01)
*G06T 7/00* (2017.01)
(Continued)

(52) U.S. Cl.
CPC ............ *G06T 7/001* (2013.01); *G06K 9/6217* (2013.01); *G06K 9/6267* (2013.01); *G06N 3/08* (2013.01);
(Continued)

(58) Field of Classification Search
CPC . G06T 2207/20084; G06T 2207/20081; G06T 2207/30148; G06T 7/0004; G06T 2207/10061; G06T 7/60; G06T 7/62; G06T 7/00; G06T 7/001; G06T 7/80; G06T 3/4046; G06T 1/00; G06T 3/40; G06T 5/006; G06T 2207/10012; G06T 2207/10056; G06T 2207/10144; G06T 2207/20036; G06N 3/0472; G06N 3/082; G06N 3/088; G06N 20/00; G06N 3/04; G06N 3/0454; G06N 3/0445; G06N 3/02; G06V 2201/06; G06V 10/25; G06V 40/1394; G06V 10/82; G06V 10/60; G06V 2201/03; G06V 2201/122; G06V 20/95; G06V 20/80; G06K 9/6256; G06K 15/00

See application file for complete search history.

(56) References Cited

U.S. PATENT DOCUMENTS

| 9,418,413 | B1* | 8/2016 | Koren | ........................ G06T 7/20 |
| 2003/0007677 | A1* | 1/2003 | Hiroi | ....................... G06T 7/001 |
| | | | | 382/149 |
| 2015/0009319 | A1* | 1/2015 | Toyoda | ................... H01L 22/12 |
| | | | | 348/126 |

* cited by examiner

*Primary Examiner* — Quan M Hua (57) ABSTRACT

This inventions provides an artificial intelligence (A.I.) identified measuring method for a semiconductor image, comprising the steps of: providing an original image of a semiconductor; identifying a type and/or a category of the original image by an artificial intelligence; introducing a predetermined dimension measuring mode corresponding to the identified type and/or the identified category to scan the original image to generate a measurement signal of the original image; and extracting a designated object from the original image to generate a specific physical parameter of the original image after operation based on a measurement signal of the designated object and the measurement signal of the original image.

15 Claims, 7 Drawing Sheets

(51) Int. Cl.
*G06N 3/08* (2006.01)
*G06T 7/62* (2017.01)
(52) U.S. Cl.
CPC ...... *G06T 7/62* (2017.01); *G06T 2207/20084* (2013.01); *G06T 2207/30148* (2013.01)

ARTIFICIAL INTELLIGENCE IDENTIFIED MEASURING METHOD FOR A SEMICONDUCTOR IMAGE

This application claims the benefit of Taiwanese application serial No. 109118308, filed on Jun. 1, 2020, the subject matter of which is incorporated herein by reference.

BACKGROUND OF THE INVENTION

Field of the Invention

The invention relates in general to a measuring method for a semiconductor image, and in particular to an artificial intelligence identified measuring method for a semiconductor image.

Description of the Related Art

As the line width of the integrated circuit gradually shrinks, how to accurately measure a semiconductor image is a the defects in the previous process step in the manufacturing process often have a great impact on the yield of the next process step. Therefore, it is a serious issue to accurately find out related defects during the manufacturing process of IC. Accordingly, an artificial intelligence identified measuring method for a semiconductor image which can provide fast and accurate measurement is highly expected by the semiconductor industry.

SUMMARY OF THE INVENTION

An aspect of this invention is to provide an artificial intelligence (A.I.) identified measuring method for a semiconductor image, comprising the steps of: providing an original image of a semiconductor; identifying a type and/or a category of the original image by artificial intelligence; introducing a predetermined dimension measuring mode corresponding to the identified type and/or the identified category to scan the original image to generate a measurement signal of the original image; and extracting a designated object from the original image to generate a specific physical parameter of the original image after operation based on a measurement signal of the designated object and the measurement signal of the original image.

The above-mentioned artificial intelligence identified measuring method for a semiconductor image, wherein the original image of a semiconductor is photoshoot and provided by a scanning electron microscope (SEM), a tunneling electron microscope (TEM), an atomic force microscope (AFM), a focused ion beam (FIB) or a X-ray diffractometer (X-ray).

The above-mentioned artificial intelligence identified measuring method for a semiconductor image, wherein the designated object is a designated structure, a designated height, a designated distance, a designated 50% height, a minimum part, a maximum part, a bottommost part or a topmost part of the original image.

The above-mentioned artificial intelligence identified measuring method for a semiconductor image, wherein the specific physical parameter is selected from one of a group consisted of a thickness, a width, an average thickness, an average width, a standard deviation of a thickness, a standard deviation of a width, a root mean square of a thickness, and a root mean square of a width of a specific layer of the semiconductor, or combinations thereof, and/or the specific physical parameter is selected from one of a group consisted of a length, a width, a height, a gap, an angle and an arc length of a designated object of the semiconductor, or combination thereof.

The above-mentioned artificial intelligence identified measuring method for a semiconductor image, wherein the operation of the measurement signal is proceed by intensity difference operation, integral difference operation or differential difference operation.

The above-mentioned artificial intelligence identified measuring method for a semiconductor image, wherein the step of identifying a type and/or a category of the original image by artificial intelligence is proceed by a neural network module.

The artificial intelligence identified measuring method for a semiconductor image as claimed in claim 1, wherein the neural network module is a Convolutional Neural Network (CNN) module or a Recurrent Neural Network (RNN) module.

Another aspect of this invention is to provide another artificial intelligence (A.I.) identified measuring method for a semiconductor image, comprising the steps of: providing an original image of a semiconductor; optimizing the original image to generate an optimized image; identifying a type and/or a category of the optimized image by artificial intelligence; introducing a predetermined dimension measuring mode corresponding to the identified type and/or the identified category to scan the optimized image to generate a measurement signal of the optimized image; and extracting a designated object from the optimized image to generate a specific physical parameter after operation based on a measurement signal of the designated object and the measurement signal of the optimized image.

The above-mentioned another artificial intelligence identified measuring method for a semiconductor image, wherein the original image of a semiconductor is photoshoot and provided by a scanning electron microscope (SEM), a tunneling electron microscope (TEM), an atomic force microscope (AFM), a focused ion beam (FIB) or a X-ray diffractometer (X-ray).

The above-mentioned another artificial intelligence identified measuring method for a semiconductor image, wherein the step of optimizing the original image to generate an optimized image is to optimized the brightness, and/or the contrast, and/or the sharpness, and/or the color saturation, and/or the gamma correction, and/or the gray scales, and/or the hue, and/or the color difference, and/or the color temperature, and/or the focus, and/or the resolution, and/or the noise, and/or the edge planarization of the original image.

The above-mentioned another artificial intelligence identified measuring method for a semiconductor image, wherein the designated object is a designated structure, a designated height, a designated distance, a designated 50% height, a minimum part, a maximum part, a bottommost part or a topmost part of the optimized image.

The above-mentioned another artificial intelligence identified measuring method for a semiconductor image, wherein the specific physical parameter is selected from one of a group consisted of a thickness, a width, an average thickness, an average width, a standard deviation of a thickness, a standard deviation of a width, a root mean square of a thickness, and a root mean square of a width of a specific layer of the semiconductor, or combinations thereof, and/or the specific physical parameter is selected from one of a group consisted of a length, a width, a height, a gap, an angle and an arc length of a designated object of the semiconductor, or combination thereof.

The above-mentioned another artificial intelligence identified measuring method for a semiconductor image, wherein the operation of the measurement signal is proceed by intensity difference operation, integral difference operation or differential difference operation.

The above-mentioned another artificial intelligence identified measuring method for a semiconductor image, wherein the step of identifying a type and/or a category of the original image by artificial intelligence is proceed by a neural network module.

The above-mentioned another artificial intelligence identified measuring method for a semiconductor image, wherein the neural network module is a Convolutional Neural Network (CNN) module or a Recurrent Neural Network (RNN) module.

DETAILED DESCRIPTION OF THE INVENTION

The detailed description provided below in connection with the appended drawings is intended as a description of the present examples and is not intended to represent the only forms in which the present example may be constructed or utilized. The description sets forth the functions of the example and the sequence of steps for constructing and operation the example. However, the same or equivalent functions and sequences may be accomplished by different examples.

In the following description, numerous specific details are described in detail in order to enable the reader to fully understand the following examples. However, embodiments of the present invention may be practiced in case no such specific details. In other cases, in order to simplify the drawings the structure of the apparatus known only schematically depicted in figures.

EMBODIMENT

Embodiment 1

Figure 1:
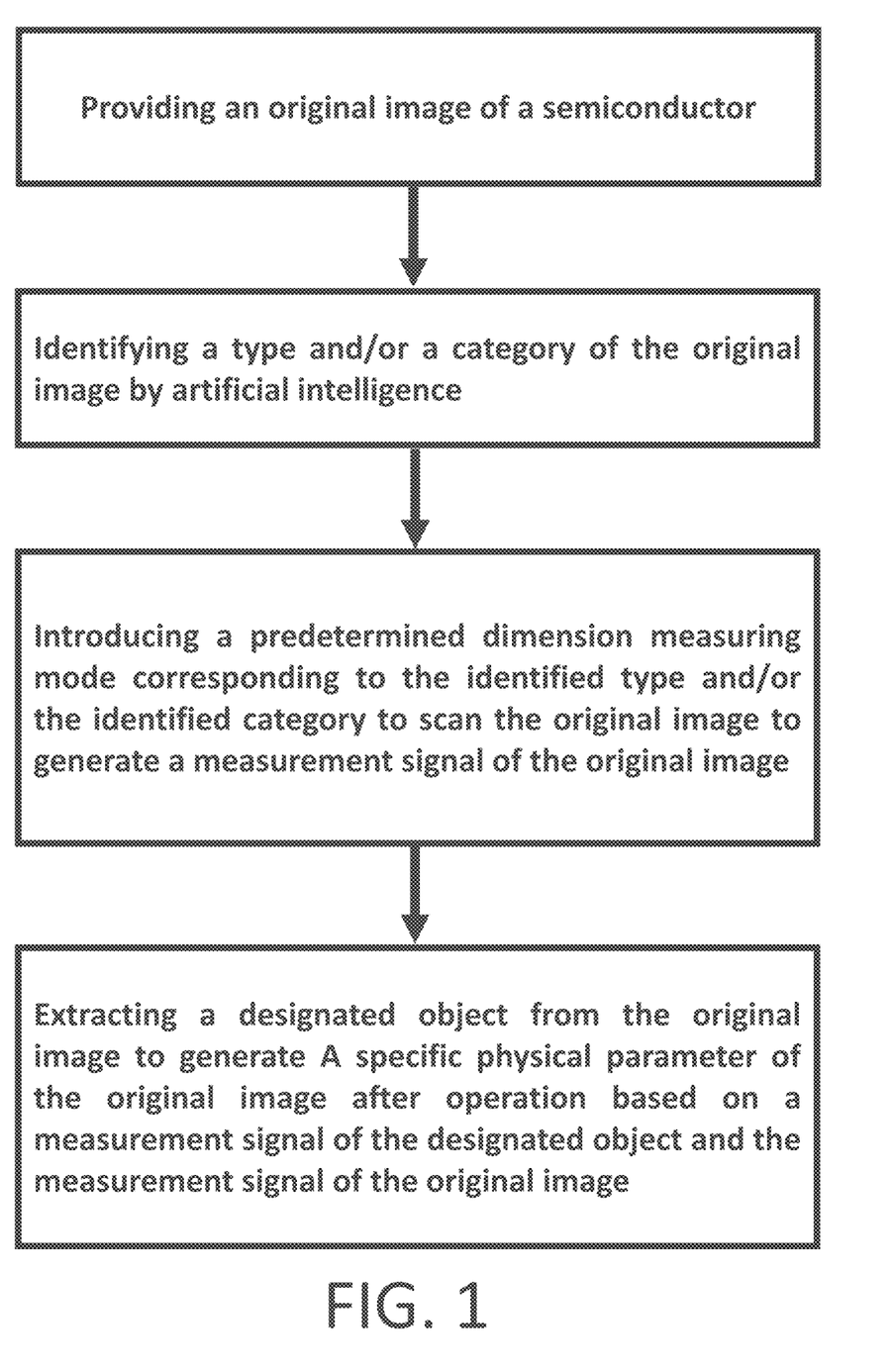
FIG. 1 is a flow-chart showing an artificial intelligence identified measuring method for a semiconductor image according to one embodiment of this present invention.

Please refer to FIG. 1, which illustrates a flow-chart showing an artificial intelligence identified measuring method for a semiconductor image according to Embodiment 1 of this present invention. As the flow chart shown in FIG. 1, Embodiment 1 according to this invention provides an artificial intelligence identified measuring method for a semiconductor image, comprising the steps of: providing an original image of a semiconductor; identifying a type and/or a category of the original image by artificial intelligence; introducing a predetermined dimension measuring mode corresponding to the identified type and/or the identified category to scan the original image to generate a measurement signal of the original image; and extracting a designated object from the original image to generate a specific physical parameter of the original image after operation based on a measurement signal of the designated object and the measurement signal of the original image.

The above-mentioned artificial intelligence identified measuring method for a semiconductor image, wherein the original image of a semiconductor is photoshoot and provided by a scanning electron microscope (SEM), a tunneling electron microscope (TEM), an atomic force microscope (AFM), a focused ion beam (FIB) or a X-ray diffractometer (X-ray).

The above-mentioned artificial intelligence identified measuring method for a semiconductor image, wherein the designated object is a designated structure, a designated height, a designated distance, a designated 50% height, a minimum part, a maximum part, a bottommost part or a topmost part of the original image.

The above-mentioned artificial intelligence identified measuring method for a semiconductor image, wherein the specific physical parameter is selected from one of a group consisted of a thickness, a width, an average thickness, an average width, a standard deviation of a thickness, a standard deviation of a width, a root mean square of a thickness, and a root mean square of a width of a specific layer of the semiconductor, or combinations thereof, and/or the specific physical parameter is selected from one of a group consisted of a length, a width, a height, a gap, an angle and an arc length of a designated object of the semiconductor, or combination thereof.

The above-mentioned artificial intelligence identified measuring method for a semiconductor image, wherein the step of identifying a type and/or a category of the original image by artificial intelligence is proceed by a neural network module.

The above-mentioned artificial intelligence identified measuring method for a semiconductor image, wherein the neural network module is a Convolutional Neural Network (CNN) module or a Recurrent Neural Network (RNN) module.

The Fin Field-Effect Transistor (FinFET) was used as an example for exemplary description in this Embodiment 1, however other semiconductors can also be measured by this artificial intelligence identified measuring method for a semiconductor image disclosed in Embodiment 1 according to this invention.

Figure 3:
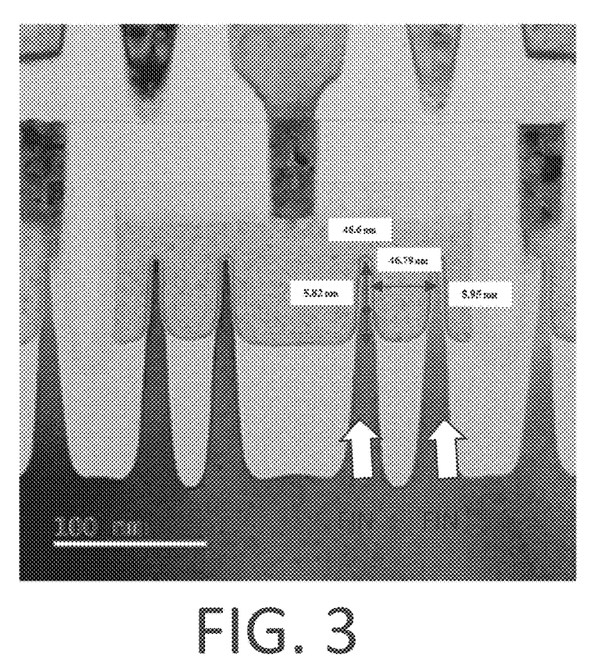
FIG. 3 is a cross-sectional view of an original TEM image of a Fin Field-Effect Transistor (FinFET) measured by the artificial intelligence identified measuring method for a semiconductor image according to one embodiment of this present invention.
Figure 4:
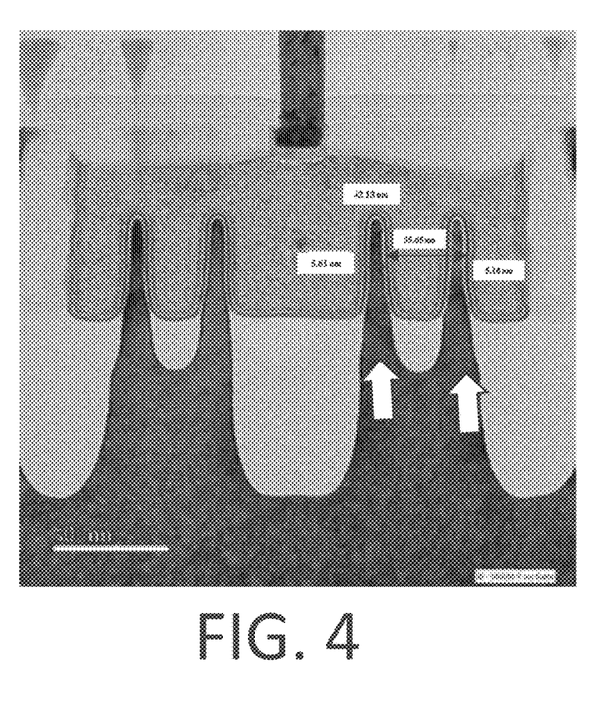
FIG. 4 is a cross-sectional view of an original TEM image of another Fin Field-Effect Transistor (FinFET) measured by the artificial intelligence identified measuring method for a semiconductor image according to one embodiment of this present invention.
Figure 5:
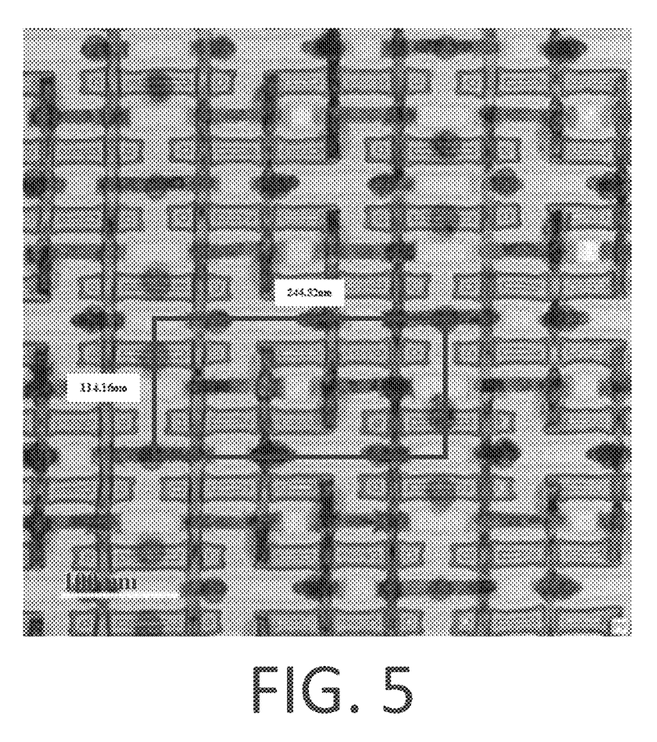
FIG. 5 is a top view of an original TEM image of a Fin Field-Effect Transistor (FinFET) measured by the artificial intelligence identified measuring method for a semiconductor image according to one embodiment of this present invention.

First, a Fin Field-Effect Transistor (FinFET) was photo-shoot by an electron microscope (TEM) to provide a cross-sectional view of an original TEM image of a Fin Field-Effect Transistor (FinFET)s as shown in FIG. 3 or 4, and a top view of an original TEM image of a Fin Field-Effect Transistor (FinFET) as shown in FIG. 5. Alternatively, the Fin Field-Effect Transistor (FinFET) can also be photoshoot by an scanning electron microscope (SEM), an atomic force microscope (AFM), a focused ion beam (FIB) or a X-ray diffractometer (X-ray).

Next, a type and/or a category of the original image was identified by artificial intelligence. As mentioned above, the step of identifying a type and/or a category of the original image by artificial intelligence was proceed by a neural network module, for example but not limited to a Convolutional Neural Network (CNN) module or a Recurrent Neural Network (RNN) module. Alternatively, the step of identifying a type and/or a category of the original image by artificial intelligence can also be proceed by a non-neural network module in other embodiments according to this invention. The cross-sectional view of the original TEM image of a Fin Field-Effect Transistor (FinFET) shown in FIG. 3 or 4 was identified as a cross-sectional view of a TEM image of a Fin Field-Effect Transistor (FinFET) by artificial intelligence. The top view of the original TEM image of a Fin Field-Effect Transistor (FinFET) shown in FIG. 5 was identified as a top view of a TEM image of a Fin Field-Effect Transistor (FinFET) by artificial intelligence.

Next, the original image was scanned by a predetermined dimension measuring mode corresponding to the identified type and/or the identified category to generate a measurement signal of the original image. The original image shown in FIG. 3 or 4 was scanned by a predetermined dimension measuring mode corresponding to the identified cross-sectional view of the original TEM image of a Fin Field-Effect Transistor (FinFET) to generate a measurement signal of the original image. The original image shown in FIG. 5 was scanned by a predetermined dimension measuring mode corresponding to the identified top view of the original TEM image of a Fin Field-Effect Transistor (FinFET) to generate a measurement signal of the original image.

Figure 6A:
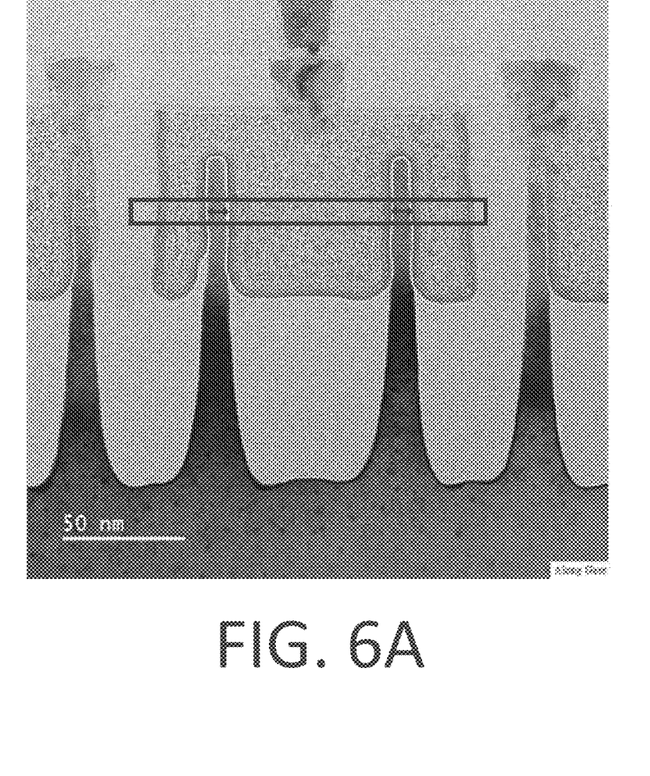
FIG. 6A is a partially enlarged cross-sectional view of an original TEM image showing a designated object extracted from FIG. 3.
Figure 6B:
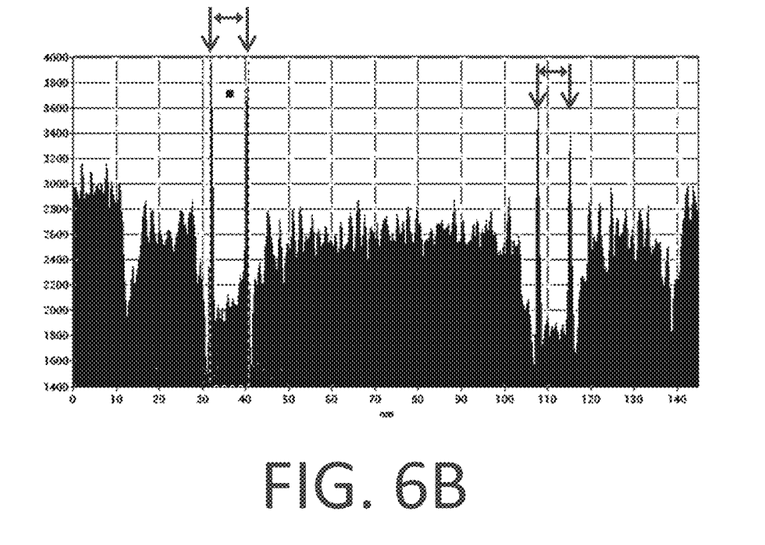
FIG. 6B is an intensity distribution of measurement signals corresponding to the designated object extracted from FIG. 3 as shown in FIG. 6A.

Finally, a designated object was extracted from the original image shown in FIG. 3, 4 or 5, and a specific physical parameter of the original image shown in FIG. 3, 4 or 5 was generated by operating thereafter based on a measurement signal of the designated object and the measurement signal of the original image shown in FIG. 3, 4 or 5. FIGS. 6A and 6B are taken as exemplary description, wherein FIG. 6A is a partially enlarged cross-sectional view of an original TEM image showing a designated object extracted from FIG. 3; FIG. 6B is an intensity distribution of the measurement signal corresponding to the designated object extracted from FIG. 3 as shown in FIG. 6A. As shown in FIG. 6A, the designated object extracted from the original image shown in FIG. 3 is the black border circled area shown in FIG. 6A, and the gap between the adjacent two fin structures of the partially enlarged cross-sectional view of an original TEM image of a Fin Field-Effect Transistor (FinFET) shown in FIG. 6A can be generated by operation for example but not limited to intensity difference operation, integral difference operation or differential difference operation based on the measurement signal of the designated object shown in FIG. 6A and the measurement signal of the original image shown in FIG. 3. Similarly, other specific physical parameters of the partially enlarged cross-sectional view of an original TEM image of a Fin Field-Effect Transistor (FinFET) shown in FIG. 6A can also be obtained by this kind of operation.

As mentioned above, the height, width and gap of the original TEM image of a Fin Field-Effect Transistor (FinFET) shown in FIG. 3 or FIG. 4 were obtained by extracting a designated object for example but not limited to the fin structure from the original image shown in FIG. 3 or FIG. 4 and operating thereafter based on the measurement signal of the fin structure of the original image shown in FIG. 3 or FIG. 4 and the measurement signal of the original image shown in FIG. 3 or FIG. 4. The height, width and gap of the fin structure of the original TEM image of a Fin Field-Effect Transistor (FinFET) shown in FIG. 3 or FIG. 4 are shown in Table 1.

TABLE 1

| | Fin structure of the Fin Field-Effect Transistor (FinFET) shown in FIG. 3 | Fin structure of the Fin Field-Effect Transistor (FinFET) shown in FIG. 4 |
| --- | --- | --- |
| Height | 48.6 nm | 42.13 nm |
| Width | 5.82 nm | 5.61 nm |
| Gap | 46.79 nm | 35.05 nm |

As mentioned above, the height and the width of the cell of the top view of an original TEM image of a Fin Field-Effect Transistor (FinFET) shown in FIG. 5 were obtained by extracting a designated object for example but not limited to the cell from the original image shown in FIG. 5 and operating thereafter based on the measurement signal of the cell of the original image shown in FIG. 5 and the measurement signal of the original image shown in FIG. 5. The height and width of the cell of the original TEM image of a Fin Field-Effect Transistor (FinFET) shown in FIG. 5 are shown in Table 2.

TABLE 2

| | Cell of the field-effect transistor shown in FIG. 5 |
| --- | --- |
| Height | 114.16 nm |
| Width | 244.32 nm |

Embodiment 2

Embodiment 2 provides another artificial intelligence identified measuring method for a semiconductor image. The major difference between the artificial intelligence identified measuring method for a semiconductor image provided in Embodiment 1 and the artificial intelligence identified measuring method for a semiconductor image provided in Embodiment 2 is the method provided in Embodiment 2 further comprises a step of optimizing the original image to generate an optimized image. Therefore, an original image with a poor image quality can be optimized in advance to enhance the accuracy of following dimension measurement.

Figure 2:
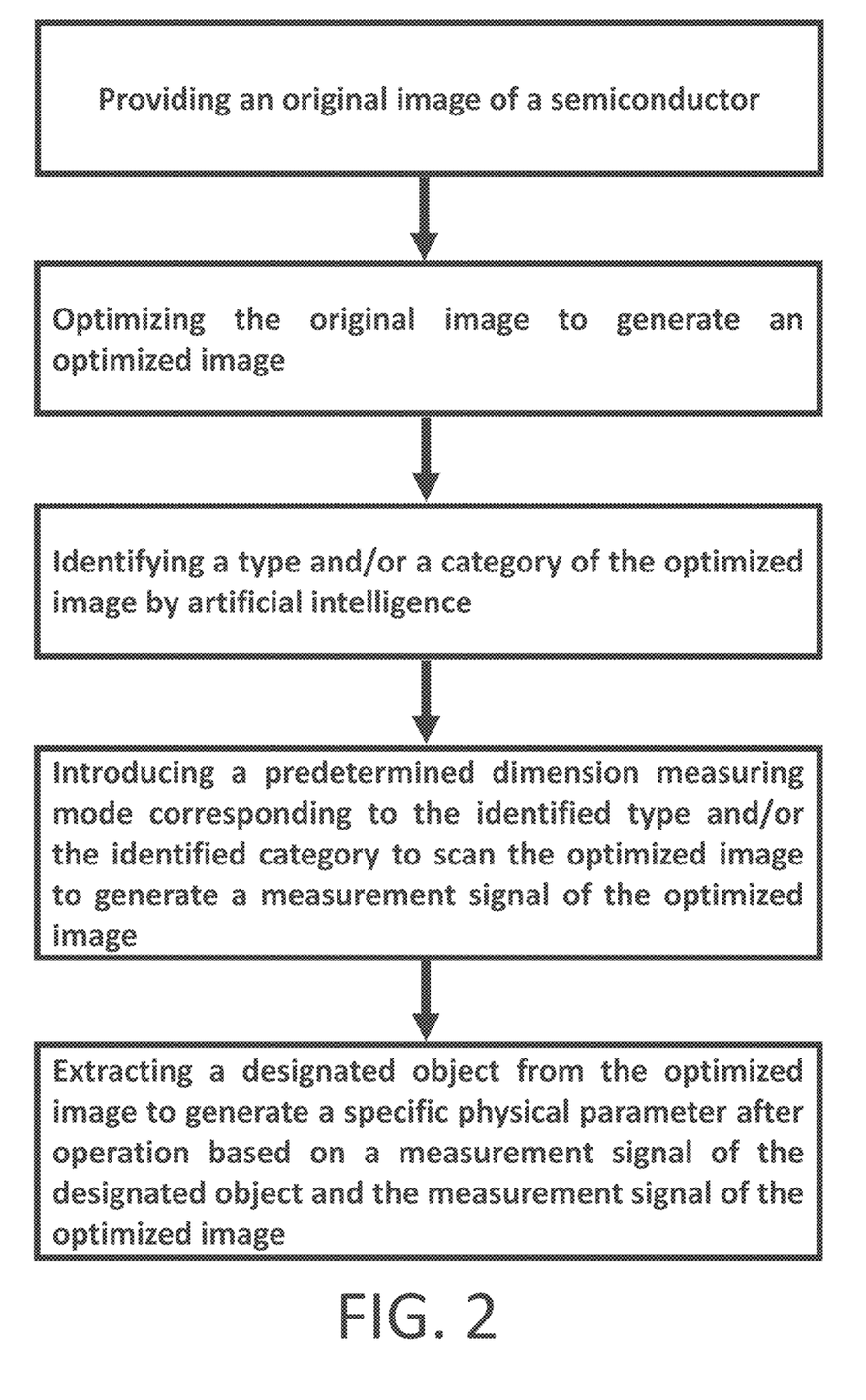
FIG. 2 is a flow-chart showing another artificial intelligence identified measuring method for a semiconductor image according to another embodiment of this present invention.

Please refer to FIG. 2, which illustrates another flow-chart showing an artificial intelligence identified measuring method for a semiconductor image according to Embodiment 2 of this present invention. As the flow chart shown in FIG. 2, Embodiment 2 of this invention provides another artificial intelligence identified measuring method for a semiconductor image, comprising the steps of: providing an original image of a semiconductor; optimizing the original image to generate an optimized image; identifying a type and/or a category of the optimized image by artificial intelligence; introducing a predetermined dimension measuring mode corresponding to the identified type and/or the identified category to scan the optimized image to generate a measurement signal of the optimized image; and extracting a designated object from the optimized image to generate a specific physical parameter of the optimized image after operation based on a measurement signal of the designated object and the measurement signal of the optimized image.

The above-mentioned another artificial intelligence identified measuring method for a semiconductor image, wherein the original image of a semiconductor is photoshoot and provided by a scanning electron microscope (SEM), a tunneling electron microscope (TEM), an atomic force microscope (AFM), a focused ion beam (FIB) or a X-ray diffractometer (X-ray).

The above-mentioned another artificial intelligence identified measuring method for a semiconductor image, wherein the step of optimizing the original image to generate an optimized image is to optimized the brightness, and/or the contrast, and/or the sharpness, and/or the color saturation, and/or the gamma correction, and/or the gray scales, and/or the hue, and/or the color difference, and/or the color temperature, and/or the focus, and/or the resolution, and/or the noise, and/or the edge planarization of the original image.

The above-mentioned another artificial intelligence identified measuring method for a semiconductor image, wherein the designated object is a designated structure, a designated height, a designated distance, a designated 50% height, a minimum part, a maximum part, a bottommost part or a topmost part of the original image.

The above-mentioned another artificial intelligence identified measuring method for a semiconductor image, wherein the specific physical parameter is selected from one of a group consisted of a thickness, a width, an average thickness, an average width, a standard deviation of a thickness, a standard deviation of a width, a root mean square of a thickness, and a root mean square of a width of a specific layer of the semiconductor, or combinations thereof, and/or the specific physical parameter is selected from one of a group consisted of a length, a width, a height, a gap, an angle and an arc length of a designated object of the semiconductor, or combination thereof.

The above-mentioned another artificial intelligence identified measuring method for a semiconductor image, wherein the step of identifying a type and/or a category of the original image by artificial intelligence is proceed by a neural network module.

The above-mentioned another artificial intelligence identified measuring method for a semiconductor image, wherein the neural network module is a Convolutional Neural Network (CNN) module or a Recurrent Neural Network (RNN) module.

The Fin Field-Effect Transistor (FinFET) is used as an example for exemplary description in this Embodiment 2, however other semiconductors can also be measured by this artificial intelligence identified measuring method for a semiconductor image disclosed in Embodiment 2 according to this invention.

Figure 7A:
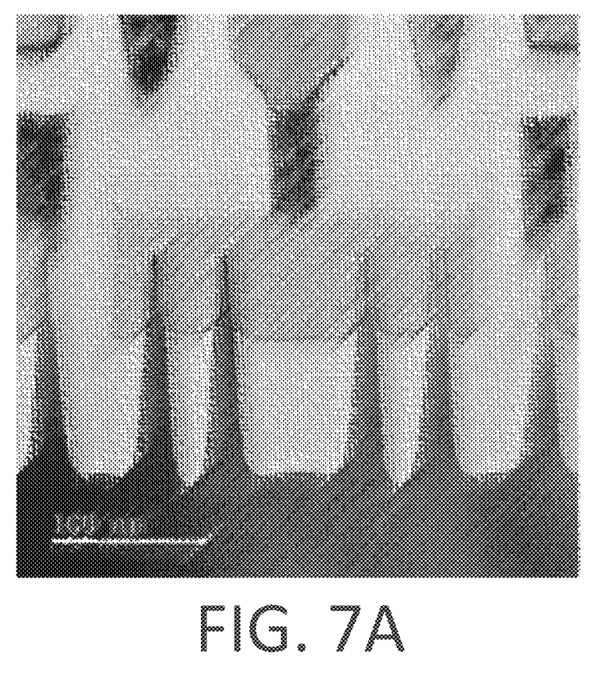
FIG. 7A is a cross-sectional view of an original TEM image of another Fin Field-Effect Transistor (FinFET) measured by another artificial intelligence identified measuring method for a semiconductor image according to another embodiment of this present invention.
Figure 7B:
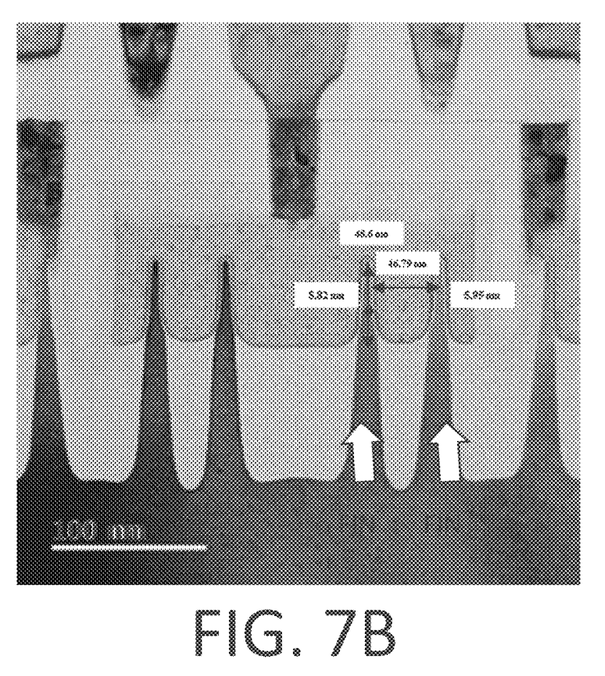
FIG. 7B is an optimized image of the original image shown in FIG. 7A.
Figure 8A:
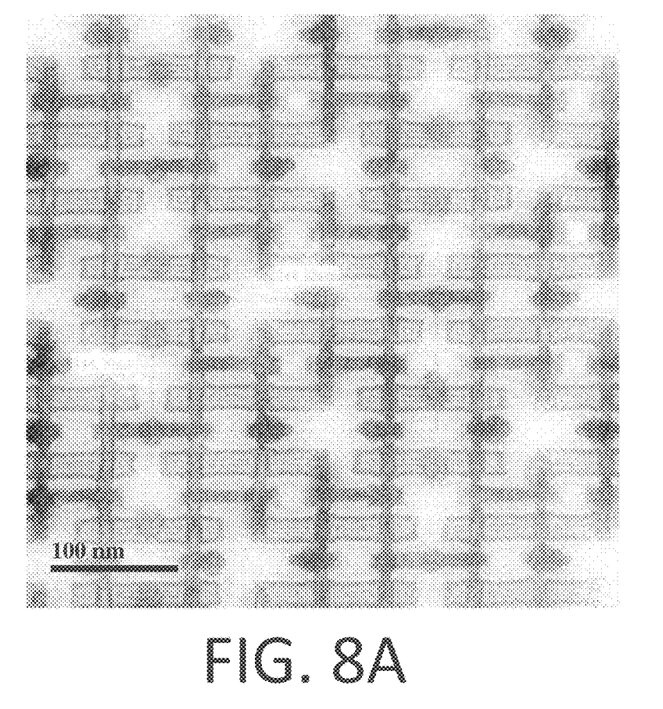
FIG. 8A is a top view of an original TEM image of another Fin Field-Effect Transistor (FinFET) measured by another artificial intelligence identified measuring method for a semiconductor image according to another embodiment of this present invention.
Figure 8B:
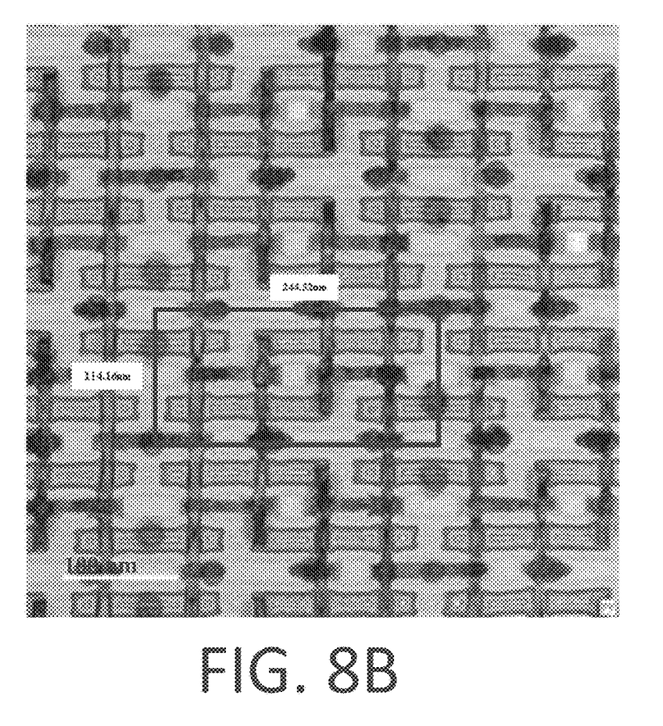
FIG. 8B is an optimized image of the original image shown in FIG. 8A.

First, a Fin Field-Effect Transistor (FinFET) was photoshoot by an electron microscope (TEM) to provide a cross-sectional view of original TEM image of a Fin Field-Effect Transistor (FinFET) as shown in FIG. 7A and a top view of original TEM image of a Fin Field-Effect Transistor (FinFET) as shown in FIG. 8A. Alternatively, the Fin Field-Effect Transistor (FinFET) can also be photoshoot by an scanning electron microscope (SEM), an atomic force microscope (AFM), a focused ion beam (FIB) or a X-ray diffractometer (X-ray). As shown in FIG. 7A and FIG. 8A, the image qualities of the cross-sectional view of original TEM image of a Fin Field-Effect Transistor (FinFET) as shown in FIG. 7A and the top view of original TEM image of a Fin Field-Effect Transistor (FinFET) as shown in 8A are poor, which might affect the accuracy of following dimensional measurement. Therefore, the artificial intelligence identified measuring method for a semiconductor image of the Embodiment 2 according to this invention further comprises a step of optimizing the original image as shown in FIG. 7A or FIG. 8A to generate an optimized image as shown in FIG. 7B or FIG. 8B in advance to enhance the accuracy of following dimension measurement. As mentioned above, the step of optimizing the original image to generate an optimized image is to optimized the brightness, and/or the contrast, and/or the sharpness, and/or the color saturation, and/or the gamma correction, and/or the gray scales, and/or the hue, and/or the color difference, and/or the color temperature, and/or the focus, and/or the resolution, and/or the noise, and/or the edge planarization of the original image.

Next, a type and/or a category of the optimized image shown in FIG. 7B or FIG. 8B was identified by artificial intelligence. As mentioned above, the step of identifying a type and/or a category of the optimized image shown in FIG. 7B or FIG. 8B by artificial intelligence was proceed by a neural network module, for example but not limited to a Convolutional Neural Network (CNN) module or a Recurrent Neural Network (RNN) module. Alternatively, the step of identifying a type and/or a category of the optimized image shown in FIG. 7B or FIG. 8B by artificial intelligence can also be proceed by a non-neural network module.

Next, the optimized image shown in FIG. 7B or FIG. 8B was scanned by a predetermined dimension measuring mode corresponding to the identified type and/or the identified category to generate a measurement signal of the optimized image shown in FIG. 7B or FIG. 8B.

Finally, the height, width and gap of the fin structure and/or the height, width and gap of the cell of the optimized image shown in FIG. 7B or FIG. 8B were obtained by extracting a designated object from the optimized image shown in FIG. 7B or FIG. 8B and operating thereafter by for example but not limited to intensity difference operation, integral difference operation or differential difference operation based on a measurement signal of the designated object of the optimized image shown in FIG. 7B or FIG. 8B and the measurement signal of the optimized image shown in FIG. 7 or FIG. 8B.

To sum up, the artificial intelligence identified measuring method for a semiconductor image according to this invention can improve the disadvantages suffered by the conventional method of preparing a sample for physical analysis by identifying a type and/or a category of the original image by artificial intelligence to introduce a predetermined dimension measuring mode corresponding to the identified type and/or the identified category to quickly and accurately measure the dimensions of semiconductors belonging to different types or categories.

Although particular embodiments have been shown and described, it should be understood that the above discussion is not intended to limit the present invention to these embodiments. Persons skilled in the art will understand that various changes and modifications may be made without departing from the scope of the present invention as literally and equivalently covered by the following claims.

What is claimed is:

1. An artificial intelligence identified measuring method for a semiconductor image, comprising the steps of:
    providing an original image of a semiconductor;
    identifying a type and/or a category of the original image by artificial intelligence;
    introducing a predetermined dimension measuring mode corresponding to the identified type and/or the identified category to scan the original image to generate a measurement signal of the original image; and
    extracting a designated object from the original image to generate a specific physical parameter of the original image after operation based on a measurement signal of the designated object and the measurement signal of the original image.

2. The artificial intelligence identified measuring method for a semiconductor image as claimed in claim 1, wherein the original image of a semiconductor is photoshoot and provided by a scanning electron microscope (SEM), a tunneling electron microscope (TEM), an atomic force microscope (AFM), a focused ion beam (FIB) or a X-ray diffractometer (X-ray).

3. The artificial intelligence identified measuring method for a semiconductor image as claimed in claim 1, wherein the designated object is a designated structure, a designated height, a designated distance, a designated 50% height, a minimum part, a maximum part, a bottommost part or a topmost part of the original image.

4. The artificial intelligence identified measuring method for a semiconductor image as claimed in claim 1, wherein the specific physical parameter is selected from one of a group consisted of a thickness, a width, an average thickness, an average width, a standard deviation of a thickness, a standard deviation of a width, a root mean square of a thickness, and a root mean square of a width of a specific layer of the semiconductor, or combinations thereof, and/or the specific physical parameter is selected from one of a group consisted of a length, a width, a height, a gap, an angle and an arc length of a designated object of the semiconductor, or combination thereof.

5. The artificial intelligence identified measuring method for a semiconductor image as claimed in claim 1, wherein the operation of the measurement signal is proceed by intensity difference operation, integral difference operation or differential difference operation.

6. The artificial intelligence identified measuring method for a semiconductor image as claimed in claim 1, wherein the step of identifying a type and/or a category of the original image by artificial intelligence is proceed by a neural network module.

7. The artificial intelligence identified measuring method for a semiconductor image as claimed in claim 6, wherein the neural network module is a Convolutional Neural Network (CNN) module or a Recurrent Neural Network (RNN) module.

8. An artificial intelligence identified measuring method for a semiconductor image, comprising the steps of:
    providing an original image of a semiconductor;
    optimizing the original image to generate an optimized image;
    identifying a type and/or a category of the optimized image by artificial intelligence;
    introducing a predetermined dimension measuring mode corresponding to the identified type and/or the identified category to scan the optimized image to generate a measurement signal of the optimized image; and
    extracting a designated object from the optimized image to generate a specific physical parameter after operation based on a measurement signal of the designated object and the measurement signal of the optimized image.

9. The artificial intelligence identified measuring method for a semiconductor image as claimed in claim 8, wherein the original image of a semiconductor is photoshoot and provided by a scanning electron microscope (SEM), a tunneling electron microscope (TEM), an atomic force microscope (AFM), a focused ion beam (FIB) or a X-ray diffractometer (X-ray).

10. The artificial intelligence identified measuring method for a semiconductor image as claimed in claim 8, wherein the step of optimizing the original image to generate an optimized image is to optimized the brightness, and/or the contrast, and/or the sharpness, and/or the color saturation, and/or the gamma correction, and/or the gray scales, and/or the hue, and/or the color difference, and/or the color temperature, and/or the focus, and/or the resolution, and/or the noise, and/or the edge planarization of the original image.

11. The artificial intelligence identified measuring method for a semiconductor image as claimed in claim 8, wherein the designated object is a designated structure, a designated height, a designated distance, a designated 50% height, a minimum part, a maximum part, a bottommost part or a topmost part of the optimized image.

12. The artificial intelligence identified measuring method for a semiconductor image as claimed in claim 8, wherein the specific physical parameter is selected from one of a group consisted of a thickness, a width, an average thickness, an average width, a standard deviation of a thickness, a standard deviation of a width, a root mean square of a thickness, and a root mean square of a width of a specific layer of the semiconductor, or combinations thereof, and/or the specific physical parameter is selected from one of a group consisted of a length, a width, a height, a gap, an angle and an arc length of a designated object of the semiconductor, or combination thereof.

13. The artificial intelligence identified measuring method for a semiconductor image as claimed in claim 8, wherein the operation of the measurement signal is proceed by intensity difference operation, integral difference operation or differential difference operation.

14. The artificial intelligence identified measuring method for a semiconductor image as claimed in claim 8, wherein the step of identifying a type and/or a category of the original image by artificial intelligence is proceed by a neural network module.

15. The artificial intelligence identified measuring method for a semiconductor image as claimed in claim 14, wherein the neural network module is a Convolutional Neural Network (CNN) module or a Recurrent Neural Network (RNN) module.

* * * * *